Dec. 18, 1928.
M. REID
1,695,979
TUBE TESTING MACHINE
Filed Aug. 12, 1926
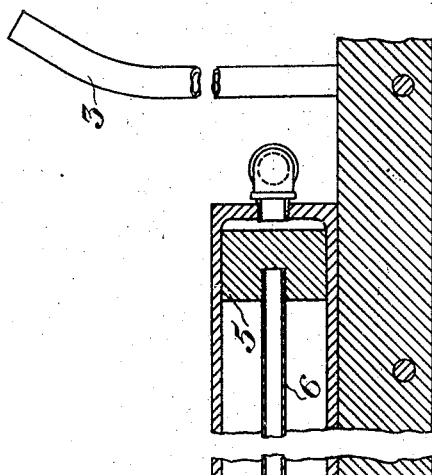
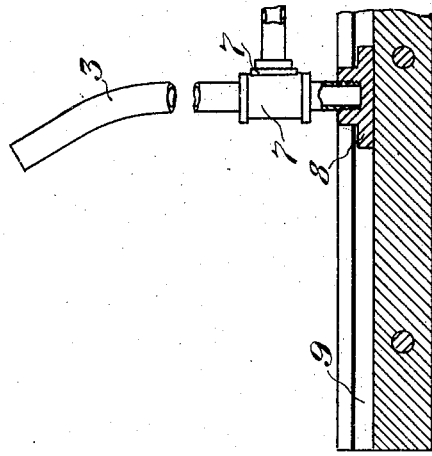
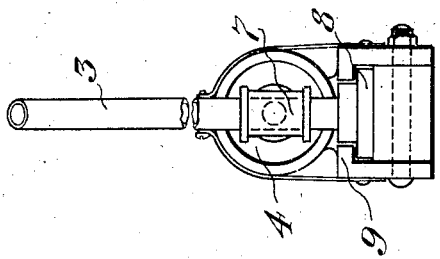
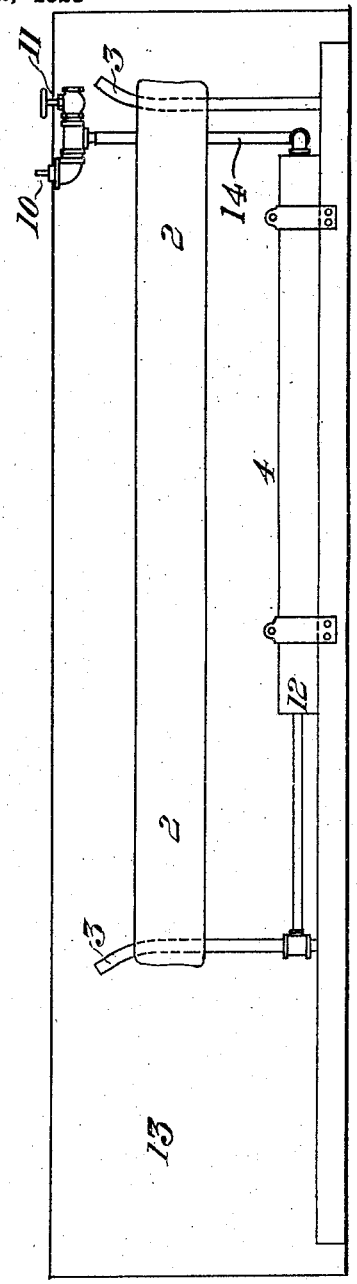
Matthew Reid
Inventor
by J. L. Boyden
Attorney Patented Dec. 18, 1928.

1,695,979

UNITED STATES PATENT OFFICE.

MATTHEW REID, OF VANCOUVER, BRITISH COLUMBIA, CANADA.

TUBE-TESTING MACHINE.

Application filed August 12, 1926. Serial No. 128,806.

This invention relates to a device for testing the inner tubes of automobile tires for air leaks. Its object is to effect this work with more thoroughness, greater rapidity and less labour than is now practical with current methods.

To obtain greater results I make use of a simple rectangular water tank which is entirely independent of the device itself—in a size convenient for holding a tire tube. Into this tank my device is placed, mounted for convenience on a board or plank. The plank base carries two uprights prepared to receive the tube which is slipped closely over them.

A simple type of air cylinder and piston is secured to the base between the uprights, the piston of which is adapted to engage and propel one of the uprights along a slide, thus increasing the distance between the uprights and stretching the tube whereby small apertures or punctures are exaggerated and the wall of the tube surrounding same weakened because made thinner by the stretch. Thus the effect of the punctures is brought under observation when the tube is immersed in water and any holes readily located for repairs.

Obviously other means for stretching the tube may be employed other than the air cylinder, where compressed air is not available, such as an hydraulic cylinder or a rack and pinion gear, these means in no way effecting the generic principle of my invention here disclosed.

This process of stretching and testing the tube can be performed almost instantly and any and all leaks in the tube are immediately disclosed.

The device is fully explained by reference to the drawings herewith, which form part of this application where—

Fig. 1 is a longitudinal section of the air cylinder and parts adjacent.

Fig. 2, an end elevation, and

Fig. 3, a general longitudinal view of the complete arrangement.

The wood base is (1), the tube stretched for the water test (2), the uprights carrying the tube (3), the air cylinder (4), piston (5), piston rod (6) terminating in an attachment to the movable stretcher upright at (7), the sliding member carrying the movable upright (8), the guideway or slide for the latter (9).

The cylinder is supplied with air under pressure at the tube valve 10 and through the supply pipe 14 upon which the piston (5) moves outwardly towards (12), propelling the movable upright towards the end of the slide (9) and thereby stretching the tube, the tank 13 is then filled with water, and air under pressure is admitted to the stretched tube under test when the position of a puncture in the tube is disclosed by air escaping therefrom and assuming the form of bubbles in the water.

When the air is released by opening the stop valve (11), the contraction of the tube draws the piston again to the starting point ready for the next operation.

Having now particularly described my invention, what I claim is:—

In a device for testing a submersed inner tube for an automobile tire the combination comprising, a base member having two metal tubes forming right angularly projecting supports for and adapted to receive said inner tube, one of said projecting supports being fixed and one slidable in a direction to or from said fixed support, a cylinder of relatively thin metal, a piston engaging said cylinder, a rod secured to said piston, said rod being attached to said slidable support by a T-piece pipe fitting, means for admitting and releasing compressed air respectively to and from said cylinder, and means secured to the said base member for suitably guiding said slidable support.

In testimony whereof I affix my signature.

MATTHEW REID.